United States Patent [19]

Allega

[11] Patent Number: 5,244,172
[45] Date of Patent: Sep. 14, 1993

[54] HIGHWAY SUPPORT STAND AND METHOD FOR TEMPORARY SIGNS

[76] Inventor: James Allega, 6668 Hidden Lake Trail, Brecksville, Ohio 44141

[21] Appl. No.: 867,999

[22] Filed: Apr. 14, 1992

[51] Int. Cl.$^5$ ............................................ F16M 11/00
[52] U.S. Cl. ..................................................... 248/161
[58] Field of Search ............... 248/158, 161, 176, 274, 248/298; 40/606, 612

[56] References Cited

U.S. PATENT DOCUMENTS

| | | | |
|---|---|---|---|
| 2,541,434 | 2/1951 | Nelson et al. | 248/274 X |
| 2,655,748 | 10/1953 | Hirt | 40/612 |
| 3,950,874 | 4/1976 | Diggs | 40/606 X |
| 4,249,832 | 2/1981 | Schmanski | 40/606 X |
| 4,338,041 | 7/1982 | Schmanski . | |
| 4,502,812 | 4/1985 | Zucker . | |
| 4,661,010 | 4/1987 | Almér et al. . | |
| 4,751,893 | 6/1988 | Brantley . | |
| 4,888,894 | 12/1989 | Brown, Jr. | 40/606 |
| 4,954,009 | 9/1990 | Kellison . | |
| 5,015,119 | 5/1991 | Schmanski . | |

OTHER PUBLICATIONS

Ohio Dot Drawing No. 210511 Entitled: "Temporary Sign Support" May, 1990.

*Primary Examiner*—Ramon O. Ramirez
*Attorney, Agent, or Firm*—Renner, Otto, Boisselle & Sklar

[57] ABSTRACT

A temporary sign support stand that is mountable to a concrete barrier in a manner that affords high resistance to toppling from high winds or wind turbulence caused by vehicles passing close by. The support stand comprises an inverted U-shape saddle and a support on the saddle for supporting a post for a sign or other member. The width of the saddle is adjustable to accommodate different widths of concrete barriers and provision is made for anchoring the legs of the saddle to respective sides of the concrete barrier, thereby to securely hold the support stand to the concrete barrier.

16 Claims, 2 Drawing Sheets

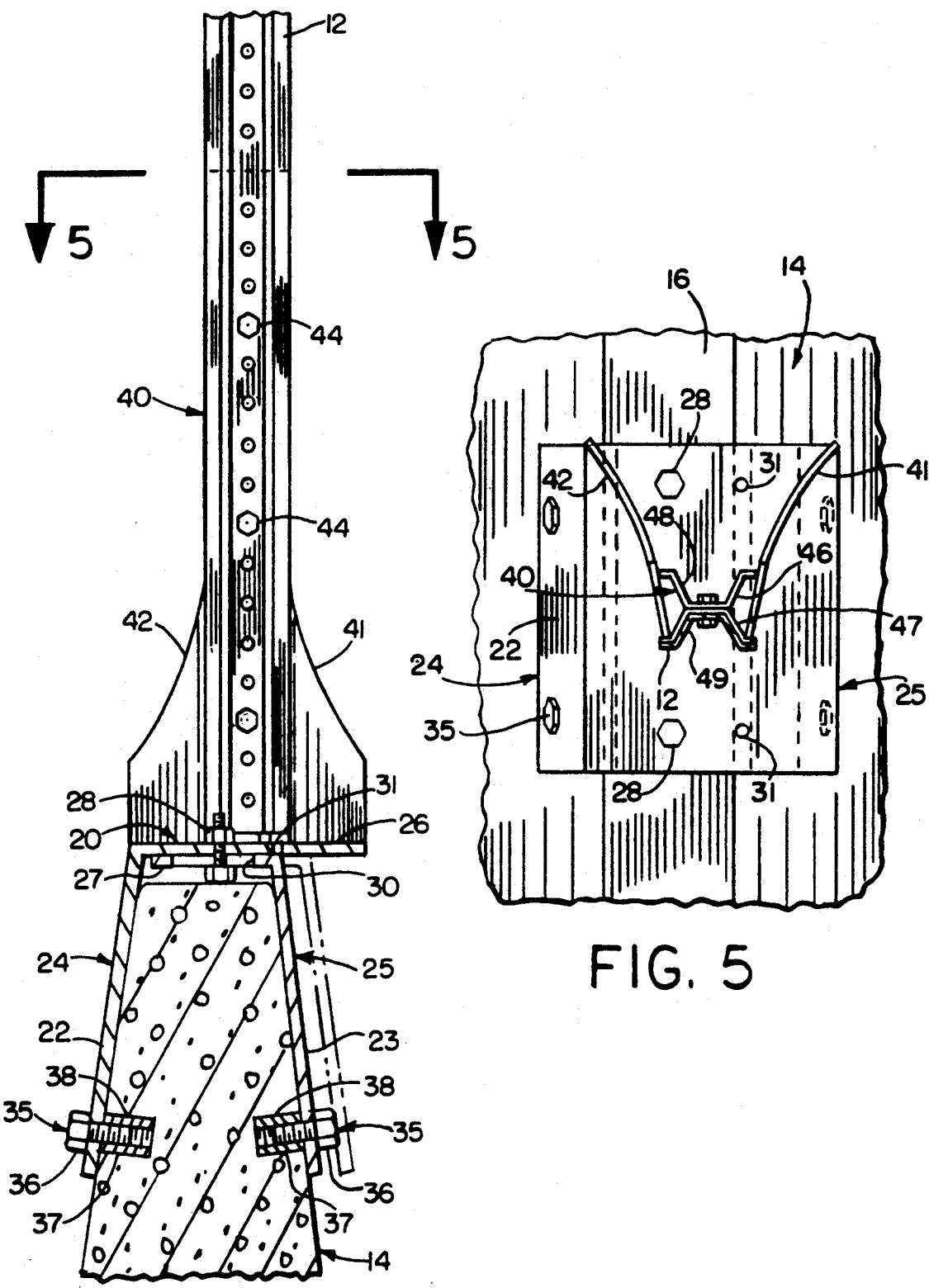

HIGHWAY SUPPORT STAND AND METHOD FOR TEMPORARY SIGNS

The invention herein described relates generally to devices which are positioned on concrete barriers such as those used as highway median, shoulder and lane dividing barriers. More particularly, the invention relates to highway support stands for signs or other members that may have occasion to be mounted to concrete barriers, and especially those that require only temporary mounting to the concrete barriers.

BACKGROUND

At work sites along highways it is often desirable if not necessary to display various types of temporary signs such as warning signs and traffic control signs. As the work progresses, these temporary signs may be moved from place to place, and upon completion of the work removed from the work site for reuse at a different work site.

Various techniques have been employed for displaying temporary signs along a highway as during a construction or repair project. At one extreme is the use of permanently installed support stands for the signs. An obvious drawback of this approach is that the support stand, being permanently installed at the particular work site, cannot be reused at another work site. Hence, less costly and more flexible alternative techniques have been employed.

These alternative techniques include the use of a variety of portable support stands that are characterized by the provision of a ground engaging base structure of sufficient width to hold upright a sign post or other sign supporting structure. To prevent toppling of these support stands, sand bags or the like are often placed atop the base structure. Unfortunately, these support stands are still prone to toppling under high wind conditions or by reason of air turbulence generated by the passage of large vehicles such as trucks if the sign is positioned close to the path of moving traffic.

Another type of portable support stand for temporary signs that has been proposed is a support device that is mountable atop the concrete barriers that are often used at work sites to protect the work site, to define traffic lanes, etc. The concrete barriers are typically in the form of cast concrete blocks that have a broad, flat base and taper upwardly to a relatively narrow flat top about 30 to 40 inches above the road surface. This prior art support device has an inverted U-shape structure that could be placed atop the concrete barrier with the depending legs thereof straddling the upper portion of the concrete barrier. The legs are provided with set screws that could be screwed inwardly to engage the sides of the concrete barrier to hold the support stand to the concrete barrier.

SUMMARY OF THE INVENTION

The present invention provides a temporary sign support stand that is mountable to a concrete barrier in a manner that affords high resistance to toppling from high winds or wind turbulence caused by vehicles passing close by. The invention also provides a support stand that can accommodate concrete barriers of a wide range of widths.

According to one aspect of the invention, a support stand for mounting a post for a sign or other member to a concrete barrier comprises an inverted U-shape saddle and a support for the post. The saddle has a base from which a pair of laterally spaced apart legs depend for straddling the concrete barrier with the base of the saddle spanning the top of the concrete barrier. The spacing between the legs of the saddle is adjustable in width for accommodating different widths of barriers; and the support, provided on the base of the saddle, functions to support the post for a sign or other member.

In accordance with a preferred embodiment of the invention, the base includes a pair of telescopically adjustable members from which respective ones of the legs depend, and suitable means are provided for securing the telescopically adjustable members against relative movement at any one of a plurality of adjustment positions. More particularly, the support stand includes a pair of L-shape members, each L-shape member having one leg thereof forming a respective one of the legs of the saddle and the other leg forming a respective one of the telescopically adjustable members.

Further in accordance with the preferred embodiment of the invention, the legs of the saddle are flared outwardly moving downwardly from the base. The support on the base includes a mounting post and at least one reinforcing member such as a gusset for maintaining the mounting post upright. The mounting post preferably includes a pair of vertically extending channels for receiving a post of a sign or other member.

According to another aspect of the invention, a support stand for mounting a post for a sign or other member to a concrete barrier comprises an inverted U-shape saddle and a support for the post. The saddle has a base from which a pair of laterally spaced apart legs depend for straddling the concrete barrier with the base of the saddle spanning the top of the concrete barrier, and provision is made for anchoring the legs to respective sides of the concrete barrier, thereby to securely hold the support stand to the concrete barrier.

According to a preferred embodiment, a plurality of anchoring devices are provided for securely holding the legs of the support stand saddle to the concrete barrier. The anchoring devices are used to removably secure the legs of the saddle to the concrete barrier, the legs each preferably including horizontally spaced apart holes through which the anchoring devices extend.

The present invention also provides a sign support system comprising the support stand in combination with the concrete barrier, and further in combination with a sign and sign post. Also provided is a method of mounting a post for a sign or other member to a concrete barrier comprising the steps of (a) placing an inverted U-shape saddle onto the barrier with the legs thereof straddling the barrier and the base spanning the top of the barrier, (b) using at least one anchoring device anchored with respect to said concrete barrier to hold the legs of the saddle against the sides of the barrier, and (c) attaching the post to a support on the saddle.

The foregoing and other features of the invention are hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

FIG. 4 is a part elevational, part sectional view of the support stand taken from the line 4—4 of FIG. 2.

FIG. 5 is a top plan view of the support stand taken from the line 5—5 of FIG. 4.

DETAILED DESCRIPTION

Figure 1:
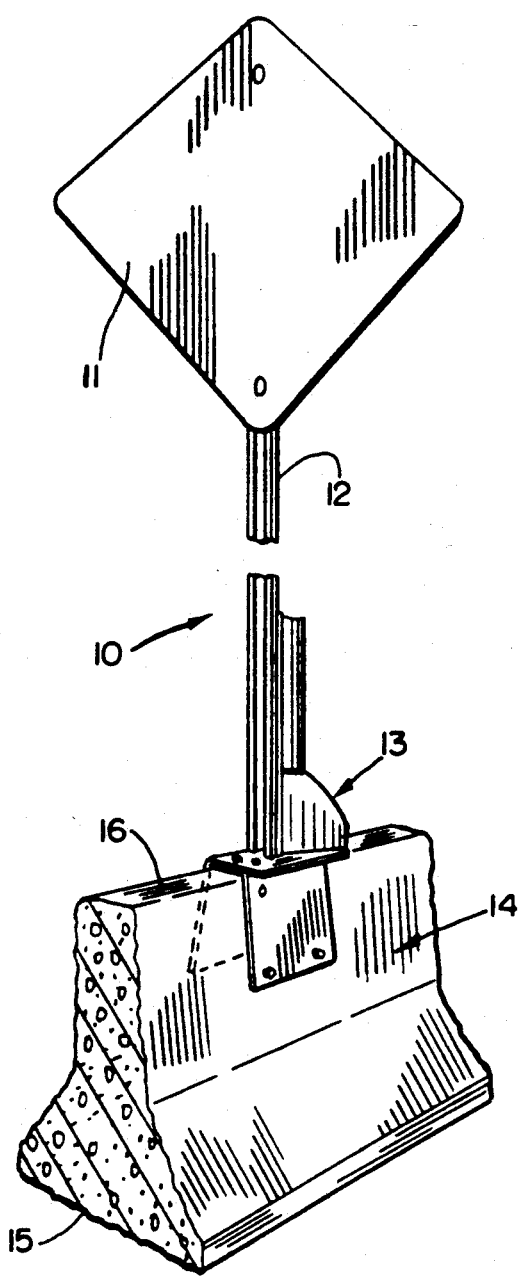
FIG. 1 is a perspective view of a temporary sign support system including a support stand according to the invention.
Figure 2:
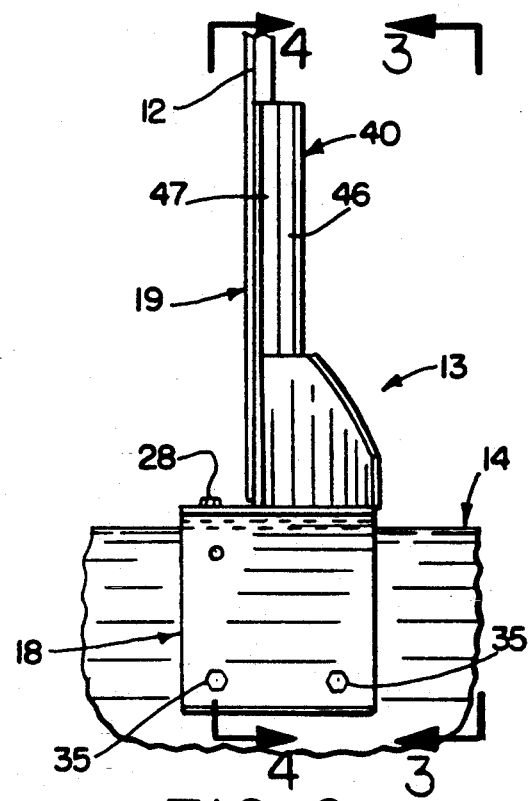
FIG. 2 is a side elevational view of the support stand of FIG. 1.

Referring now in detail to the drawings and initially to FIG. 1, a temporary sign support system according to the invention is indicated generally at 10. The system generally comprises a sign 11, a sign post 12, and a support stand 13 that is mounted to a concrete barrier 14. The illustrated concrete barrier 14 is of the type commonly used at work sites to protect the work site, to define traffic lanes, etc. The concrete barrier is in the form of a cast concrete block that has a broad, flat base 15 and sides that taper upwardly to a relatively narrow flat top 16 typically about 30 to 40 inches above the road surface.

As shown in FIGS. 2-5, the support stand 13 comprises an inverted U-shape saddle 18 and a support 19 for the sign post 12. The saddle 18 has a base 20 from which a pair of laterally spaced apart legs 22 and 23 depend for straddling the concrete barrier 14 with the base of the saddle spanning and preferably resting on the top 16 of the concrete barrier 14.

The spacing between the legs 22 and 23 of the saddle 18 preferably is adjustable in width for accommodating different widths of concrete barriers 14. To this end, in the illustrated preferred embodiment of support stand, the saddle 18 is formed by a pair of L-shape members 24 and 25. Each L-shape member 24, 25 has one leg thereof forming a respective one of the legs 22 and 23 of the saddle. The other legs 26 and 27 of the L-shape members 24 and 25 overlap one another to form the base 20 of the saddle and are telescopically adjustable to provide for adjustment of the spacing between the depending legs 22 and 23 of the saddle, as exemplified by the increased width phantom line position of the L-shape member 25 in FIG. 4. The telescopically adjustable legs are secured against relative movement at any one of a plurality of adjustment positions by suitable fastening devices 28, such as nuts and bolts or other suitable fastening means.

In the illustrated embodiment, two nut and bolt fastening devices 28 are employed as best seen in FIG. 5. As seen in FIGS. 4 and 5, the threaded shank of the bolt of each fastening device extends through holes respectively provided in the overlapping legs 26 and 27, and the hole 30 in the lower one (27) of the overlapping legs is laterally elongated to provide a range of width adjustment for saddle 18. Also, a second hole 31 in the upper one (26) of the legs is laterally spaced from the first hole for each bolt to provide a second range of width adjustment when the second hole 31 is used. After the spacing between the depending legs 22 and 23 of the saddle is adjusted to closely match the width of the concrete barrier 14 at the upper portion thereof for a snug fit, the fastening devices 28 are tightened to secure the L-shape members 24 and 25 against movement with respect to one another.

Figure 3:
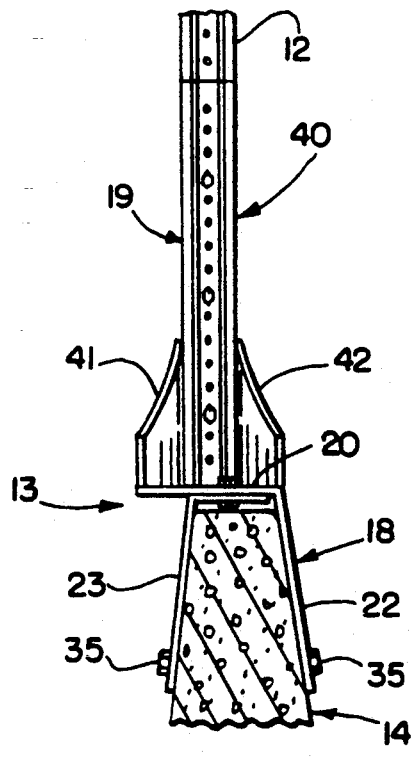
FIG. 3 is an end elevational view of the support stand taken from the line 3—3 of FIG. 2.

The depending legs 22 and 23 of the saddle 18 preferably are flared outwardly moving downwardly from the saddle base 20, thereby to follow the taper of the sides of the concrete barrier 14 as seen in FIGS. 3 and 4. By closely matching the taper, the legs can fit flush against the sides of the concrete barrier, i.e., can engage the sides of the concrete barrier over substantially the entire area of the legs. This provides a stable supporting relationship between the saddle and the concrete barrier.

At the lower end of each depending leg 22 and 23 there are provided one or more anchoring devices 35 for holding the leg to the adjacent side of the concrete barrier 14 and against movement away from the side of the concrete barrier. In the illustrated preferred embodiment, two such anchoring devices 35 are provided at the lower end of each leg 22, 23 preferably at least about one foot below the base 20. The anchoring devices 35 preferably are horizontally spaced apart no less than about the maximum spacing to which the depending legs can be adjusted and more preferably the holes are spaced apart by about one foot or more.

As illustrated, each anchoring device 35 includes an anchor bolt 36 that is fixed in a hole 38 provided in the side of the concrete barrier. The anchor bolt 36 may be of the expansion type having an anchor 37 which can be slipped into the hole 38 and expanded as the bolt 36 is screwed into the anchor.

The anchor holes 38 may be drilled or otherwise formed in the sides of the concrete barrier at locations that will permit alignment therewith of the holes in the depending legs 22 and 23 at the saddle 18. Instead of drilling, the anchor holes 38 may be formed during casting of the concrete barrier such as by use of removable core pieces. However, usually the holes will be bored on site at a selected location for a sign or other member to be mounted to the concrete barrier. The saddle may be placed on the concrete barrier at the desired location and the holes in the depending legs thereof then used as a marking template or guide for drilling of the anchor holes 38 in the sides of the concrete barrier.

Although anchor bolts are the preferred fastening devices for securely holding the depending legs of the saddle against adjacent sides of the concrete barrier, other anchoring devices may be employed. For example, one or more through holes may be provided in the concrete barrier in alignment with corresponding holes in the depending legs of the saddle. Then, a bolt may be inserted first through a hole in one of the legs of the saddle, then through the hole in the concrete barrier and then through the hole in the other leg of the saddle. A nut may then be secured to the projecting threaded end of the bolt to hold the bolt in place thereby securely anchoring the depending legs of the support stand saddle to the concrete barrier. In this arrangement, one end of the nut and bolt combination may be viewed as an anchor for the opposite end, and vice versa, the anchor end functioning to hold the fastening end to the concrete barrier with the leg of the saddle thusly clamped against the side of the concrete barrier.

As seen in FIGS. 3-5, the upper one (26) of the overlapping legs forming the base 20 of the saddle 18 is wider than the lower leg 27. This provides for a greater range of adjustment of the spacing between the depending legs 22 and 23 of the saddle. the wider upper leg 26 also provides a broader base for the support 19 extending upwardly therefrom. The support 19 provides a means by which the post of a sign or other member may be secured to the saddle and held upright. Preferably, the support has provision for removable attachment of the post for a sign or other member.

In the illustrated embodiment, the support 19 includes a support post 40 which may be welded at its lower end to the upper leg 26 of the L-shape member 24. Preferably, reinforcing members such as brackets, stays or the illustrated gussets 41 and 42 are provided and secured to the support post and the upper leg 26 as by welding to hold the support post 40 upright against anticipated loads such as wind forces acting against the sign 11. The sign 11 is attached to the upper end of the sign post 12 which is attached to the support post 40 by one or more fastening devices 44.

In the illustrated embodiment, the support post 40, which may be about one to three feet in height, is formed by a pair of channel pieces 46 and 47. Each channel piece 46, 47 in cross-section has a gull-wing shape as best seen in FIG. 5. The channel pieces 46 and 47 have respective vertical channels 48 and 49 which open in opposite directions along the longitudinal axis of the support stand 13, such longitudinal axis extending perpendicular to the width direction of the support stand. Each channel 48, 49 is configured to receive the sign post 12 of conventional type having the cross-section illustrated in FIG. 5. The sign post 12 has oppositely inclined side walls which engage correspondingly inclined sides of the channel 49 to preclude lateral movement of the sign post relative to the support post. The sign post is held in place by the fastening devices 44 extending through aligned holes in the web of the sign post and the web of the support post as illustrated. Preferably the fastening devices 44 are removable to permit detachment of the sign post. The fastening devices, for example, may be nuts and bolts.

As will be appreciated, the sign post 12 may be secured in either channel 48, 49 of the support post 40. Also, the support post may be otherwise configured as may be desired for receiving other types of sign posts. For example, the support post may be simply a bar to which a post for a sign or other member may be secured by appropriate fastening devices such as nuts and bolts, rivets, etc. It will also be appreciated by those skilled in the art that the post support 19 may take other forms than that of an upright post. For example, the support may be a socket structure provided atop the saddle 18 and into which the lower end of a post may be inserted and appropriately secured in place. Accordingly, the support 19, as referred to herein, is intended to broadly encompass a wide variety of means by which a post for a sign or other member may be supported on the saddle. Such means may include, by way of further example, welds and/or associated brackets which function to secure a sign post 12 to the saddle. This arrangement, however, is less preferred than that illustrated which provides for detachment of the sign post from supporting structure such as the support post 40. This allows the support stand to be assembled onto a concrete barrier after which the sign post may be attached to the support stand.

As should now be apparent from the foregoing, the support stand 13 may be readily mounted to a concrete barrier 14 at a desired location. Typically, the location for the support stand will be selected and then the anchor holes 38 drilled into the sides of the concrete barrier. The depending legs 22 and 23 of the saddle may then be secured by the anchor bolts 36 to the sides of the concrete barrier thereby to securely hold the support stand in place. If not done already, the sign 11 and sign post 12 may be assembled to the support post as above described, thereby providing a temporary sign support system as illustrated in FIG. 1. As will be appreciated by those skilled in the art, the support stand may be used for other purposes then temporary display of a sign such as for permanent display of a sign or for mounting other members such as, for example, reflectors, to a concrete barrier.

Although the invention has been shown and described with respect to a preferred embodiment, equivalent alterations and modifications will of course occur to others skilled in the art upon the reading and understanding of this specification. The present invention includes all such equivalent alterations and modifications, and is limited only by the scope of the following claims.

What is claimed is:

1. A support stand for mounting a post for a sign or other member to a concrete barrier, comprising an inverted U-shape saddle having a base from which a pair of laterally spaced apart legs depend for straddling a concrete barrier with the base of the saddle spanning the top of the concrete barrier, a support on said saddle for supporting a post for a sign or other member, and a plurality of anchoring devices for removably anchoring said legs to respective sides of the concrete barrier, thereby to securely hold the support stand to the concrete barrier, and wherein said base includes a pair of telescopically adjustable members from which respective ones of said legs depend, means are provided for securing said members against relative movement at any one of a plurality of adjustment positions, whereby the spacing between said legs is adjustable for accommodating different widths of barriers, and said saddle includes a pair of L-shape members, each L-shape member having one leg thereof forming a respective one of said legs of said saddle and the other leg forming a respective one of said telescopically adjustable members.

2. A support stand as set forth in claim 1, wherein said telescopically adjustable members are slidable one atop the other, one of said telescopically adjustable members includes a laterally elongated slot, and said means for securing includes a threaded shank extending through said elongated slot and a nut threaded onto said threaded shank for tightening against said one of said telescopically adjustable members.

3. A support stand for mounting a post for a sign or other member to a concrete barrier comprising an inverted U-shape saddle having a base from which a pair of laterally spaced apart legs depend for straddling a concrete barrier with the base of the saddle spanning the top of the concrete barrier, and a support on said saddle for supporting a post for a sign or other member, and wherein the spacing between said legs is adjustable for accommodating different widths of barriers, and said legs are flared outwardly moving downwardly from said base.

4. A support stand for mounting a post for a sign or other member to a concrete barrier comprising an inverted U-shape saddle having a base from which a pair of laterally spaced apart legs depend for straddling a concrete barrier with the base of the saddle spanning the top of the concrete barrier, and a support on said saddle for supporting a post for a sign or other member, and wherein the spacing between said legs is adjustable for accommodating different widths of barriers, and said support includes an upright and at least one reinforcing gusset.

5. A support stand for mounting a post for a sign or other member to a concrete barrier comprising an inverted U-shape saddle having a base from which a pair of laterally spaced apart legs depend for straddling a concrete barrier with the base of the saddle spanning the top of the concrete barrier, and a support on said saddle for supporting a post for a sign or other member, and wherein the spacing between said legs is adjustable for accommodating different widths of barriers, and said support includes an upright including at least one vertically extending channel for receiving a post of a sign or other member.

6. A support stand as set forth in claim 5, wherein said at least one vertically extending channel includes a pair of vertically extending channels for receiving a post of a sign or other member.

7. A support stand for mounting a post for a sign or other member to a concrete barrier comprising an inverted U-shape saddle having a base from which a pair of laterally spaced apart legs depend for straddling a concrete barrier with the base of the saddle spanning the top of the concrete barrier, a support on said saddle for supporting a post for a sign or other member, and means for anchoring said legs to respective sides of said concrete barrier, thereby to securely hold the support stand to the concrete barrier.

8. A support stand as set forth in claim 7, wherein said means for anchoring includes a plurality of anchoring devices fixable in holes provided in the concrete barrier for removably fastening said legs to the concrete barrier, thereby to securely hold the support stand to the concrete barrier.

9. A support stand as set forth in claim 8, wherein said legs include holes through which said anchoring devices extend, each said leg including at the lower end thereof at least two said holes that are horizontally spaced apart.

10. A support stand as set forth in claim 9, wherein the spacing between said legs of said saddle is adjustable in width to provide a minimum adjusted spacing and a maximum adjusted spacing between said legs for accommodating different widths of barriers, and said at least two said holes have two holes thereof that are horizontally spaced apart no less than about said maximum adjusted spacing between said legs.

11. A support stand as set forth in claim 8, wherein said anchoring devices include bolts and anchors for said bolts.

12. A support stand as set forth in claim 7, in combination with said concrete barrier, said legs being held to respective sides of said concrete barrier by said means for anchoring.

13. A combination as set forth in claim 12, wherein said means for anchoring includes at least one threaded fastener and threaded means engaged with said concrete barrier and operative with said threaded fastener to draw each said leg against a respective side of said barrier upon tightening of said threaded fastener.

14. A combination as set forth in claim 13, wherein said base rests on the top of said concrete barrier.

15. A combination as set forth in claim 11, comprising a post attached to said support and a sign mounted to said post.

16. A method of mounting a post for a sign or other member to a concrete barrier comprising the steps of (a) placing an inverted U-shape saddle onto the barrier with the legs thereof straddling the barrier and the base spanning the top of the barrier, (b) using at least one anchoring device anchored with respect to said concrete barrier to hold the legs of the saddle against the sides of the barrier, and (c) attaching the post to a support on the saddle.

* * * * *